(12) United States Patent
Schober et al.

(10) Patent No.: US 8,100,105 B2
(45) Date of Patent: Jan. 24, 2012

(54) BALANCE SHAFT UNIT

(75) Inventors: Michael Schober, St. Valentin (AT); Andreas Hoelzl, Wieselburg (AT); Roland Marzy, Steyr (AT)

(73) Assignee: MAGNA Powertrain AG & Co KG, Lannach (AU)

( * ) Notice: Subject to any disclaimer, the term of this patent is extended or adjusted under 35 U.S.C. 154(b) by 687 days.

(21) Appl. No.: 12/313,861

(22) Filed: Nov. 25, 2008

(65) Prior Publication Data

US 2009/0133661 A1 May 28, 2009

(30) Foreign Application Priority Data

Nov. 28, 2007 (DE) .......................... 10 2007 057 338

(51) Int. Cl.
*F02B 75/06* (2006.01)
*F01M 1/02* (2006.01)
(52) U.S. Cl. ..................... 123/192.2; 74/603; 29/888.01; 123/196 R
(58) Field of Classification Search ............... 123/192.2, 123/196 R; 74/603; 29/888.01
See application file for complete search history.

(56) References Cited

U.S. PATENT DOCUMENTS

| 7,418,938 B2 * | 9/2008 | Hashimoto et al. ........ 123/192.2 |
| 2004/0028537 A1 | 2/2004 | Shulver |

FOREIGN PATENT DOCUMENTS

| DE | 20217472 | 4/2003 |
| DE | 202006003027 | 9/2006 |
| DE | 10 2006 029 554 | 12/2007 |
| WO | 2007/096270 A1 | 8/2007 |

* cited by examiner

*Primary Examiner* — Noah Kamen
(74) *Attorney, Agent, or Firm* — Harness, Dickey & Pierce, P.L.C.

(57) ABSTRACT

The present invention relates to a balance shaft unit for mass balancing for an internal combustion engine of a motor vehicle including at least one balance shaft having at least one balance weight and a housing part in which the balance shaft is journaled. A first gear is associated with the balance shaft and meshes with a second gear. An introduction passage is formed in the housing part through which, starting from an assembly opening, at least one of the two gears can be introduced into the interior of the housing part, with the introduction passage extending perpendicular to the longitudinal axis of the balance shaft. The first gear and the second gear are arranged sequentially with respect to the direction of extent of the introduction passage. The housing part surrounds the periphery of the assembly opening in one piece, with the length of the assembly opening at the outer side of the housing part in a normal plane to the longitudinal axis of the balance shaft being smaller than the sum of the diameters of the two gears. A particularly high stability is hereby reached.

35 Claims, 4 Drawing Sheets

BALANCE SHAFT UNIT

CROSS-REFERENCE TO RELATED APPLICATIONS

This application claims the benefit and priority of German Patent Application No. 10 2007 057 338.5, filed Nov. 28, 2007. The entire disclosure of the above application is incorporated herein by reference.

FIELD

The present invention relates to a balance shaft unit for balancing forces of inertia and/or moments of inertia in an internal combustion engine of a motor vehicle.

BACKGROUND

This section provides background information related to the present disclosure which is not necessarily prior art.

Balance shafts have the purpose of balancing the forces of inertia and/or moments of inertia arising in internal combustion engines (so-called mass balancing). With specific engine types, for example with in-line engines having four cylinders, such balance shafts are used pair-wise, with the balance shafts rotating in opposite directions at twice the crankshaft speed. The balance shafts as well as the components supporting them are subject to high load due to the high speed so that the stability of balance shaft units is of great importance.

Balance shaft units having a housing and such balance shafts or balance shaft pairs are generally known. Known balance shaft units which withstand the high loads and nevertheless reliably compensate the forces of inertia and moments of inertia which occur are, however, undesirably complex and/or expensive to manufacture and/or have a large number of components to be assembled.

To take account of the increasing pressure on costs and the constantly growing limitation on the available construction space in the area of the engine, attempts are being made to integrate further assemblies into known balance shaft units to operate them together with the balance shafts. Oil pumps are frequently integrated into balance shaft units. Conventional oil pump balance shaft modules, however, have an even larger number of components and are therefore very labor-intensive in assembly.

SUMMARY

This section provides a general summary of the disclosure, and is not a comprehensive disclosure of its full scope or all of its features.

It is the object of the invention to provide a reliable balance shaft unit which satisfies the demands for high stability and simple assembly.

The balance shaft unit in accordance with the invention is operable for mass balancing internal combustion engines and includes at least one balance shaft with at least one balance weight and a housing part in which the balance shaft is journaled. A first gear is associated with the balance shaft and meshes with a second gear so that the first gear and the second gear form a drive stage. For example, the first gear can be rotationally fixedly connected to the balance shaft, whereas the second gear can be rotationally fixedly connected to a drive shaft of a pump (formation of a transmission stage) or rotationally fixedly connected to a further balance shaft (formation of a synchronization stage). Additional gears can also be provided, for example, to realize both a transmission stage between a balance shaft and a pump drive shaft and a synchronization stage between the balance shaft and a further balance shaft.

The housing part has at least one assembly opening at its outer side. An introduction passage is formed in the housing part through which, starting from the assembly opening, at least one of the two named gears can be introduced into the interior of the housing part. The introduction passage extends perpendicular to the longitudinal axis of the balance sheet, i.e. in the radial direction with respect to the longitudinal axis of the balance shaft, with the first gear and the second gear meshing therewith being arranged sequentially with respect to the direction of extent of the introduction passage. The assembly opening is therefore arranged laterally at the housing part with respect to the longitudinal axis, i.e. it is not located at one of the axial end face sides of the housing part. At least one of the two named gears can thus be introduced into the interior of the housing part in a radial direction for the assembly of the balance shaft unit.

The housing part surrounds the periphery of the assembly opening in one piece. In other words, the housing part is closed peripherally at its outer side in the environment of the assembly opening and does not have any joint faces at the assembly opening. In addition, the length of the assembly opening at the outer side of the housing part in a normal plane to the longitudinal axis of the balance shaft (i.e. along a direction perpendicular to the longitudinal axis of the balance shaft) is admittedly larger than the diameter of the at least one of the two gears which is introduced into the interior of the housing part through the assembly opening and along the introduction passage for assembly purposes. However, the named length of the assembly opening is smaller than the sum of the diameters of the two named gears (first gear and second gear of the named drive stage). The assembly opening thus has a small extent at the surface of the housing part so that the housing part is particularly stable. A high stability of the balance shaft unit is additionally ensured by the one-part design of the housing part in the region of the assembly opening, which also includes the advantage that the housing part can be made with thin walls and correspondingly light and does not itself have to be assembled in a complex and/or expensive manner through a plurality of assembly steps.

Provision is made that the named at least one of the two gears is introduced into the interior of the housing part separately from the associated shaft. For this purpose, the assembly opening is arranged at a suitable position of the housing part. The respective gear is introduced into the interior of the housing part through the assembly opening along the introduction passage and is there—that is in the interior of the housing—connected to the balance shaft or to the drive shaft or to the further balance shaft.

A particular advantage of a separate assembly opening for the gear or gears of the balance shaft unit can be seen in that the assembly opening can be made relatively small—in comparison with a housing opening for the introduction of a complete balance shaft with preassembled gears—so that the housing part is very stable, even if an additional introduction opening is provided for the axial introduction of the balance shaft.

The manufacturing costs can be reduced by the low number of components. Such a balance shaft unit can moreover be assembled in a few, simple steps, which additionally results in cost savings. A reduction in the number of the required components and of the required assembly steps also improves the process security in the manufacture.

In accordance with an embodiment of the balance shaft unit in accordance with the invention, the assembly opening is formed at the outer side of the housing part by a slit—is therefore made lengthways—with the longitudinal extent of the slit extending in a normal plane (that is perpendicular) to the longitudinal axis of the balance shaft. The longitudinal extent of the slit at the surface of the housing part thus corresponds to the arrangement of the respective gear in the interior of the housing part. The slit-like assembly opening is large enough to enable the introduction of the gear or gears of the named drive stage without simultaneously representing an unnecessarily large opening in the wall of the housing part. The term "slit-like" is not to be understood such that the assembly opening necessarily has to have a narrow, rectangular outline. The assembly opening can have any desired geometrical shape—also an irregular one. However, a rectangular outline is preferred.

The assembly opening can, for example, have an outline which at least corresponds to the outline of the largest of the named gears. All smaller gears can then likewise be introduced into the interior of the housing part through this assembly opening. Depending on the design of the gears, the geometry of the assembly opening can be optimized such that all the gears fit through the assembly opening. Optionally, a plurality of assembly openings can also be provided.

In accordance with a further preferred embodiment, the width of the assembly opening at the outer side of the housing part corresponds in a direction parallel to the longitudinal axis of the balance shaft (i.e. in a plane including the longitudinal axis of the balance shaft) to the thickness of the gear of the balance shaft unit to be introduced along the introduction passage, with the required clearance being provided to be able to move the respective gear contact-free or at least friction-free through the assembly opening. The assembly opening in this case therefore has a minimally required width, which as an advantageous effect on the stability of the housing part. Provided that a plurality of gears of different drive stages should be introduced into the interior of the housing part through the assembly opening (for example a gear of a transmission stage and a gear of a synchronization stage), the width of the assembly opening can correspond to the thickness of two gears arranged axially adjacent to one another (again while taking account of the required clearance).

It is furthermore preferred when the named introduction passage extends in the vertical direction in the position of use of the balance shaft unit, with the assembly opening being arranged at the upper side of the housing part and with the housing part being fastened to the lower side of the internal combustion engine. Such a vertical introduction passage can additionally serve the purpose of simultaneously forming a lubrication oil supply for the gears or for further lubrication points of the balance shaft unit. In the position of use of the balance shaft unit, the lubrication oil can namely flow downwardly from the internal combustion engine through the assembly opening and along the named introduction passage to the different lubrication points.

In accordance with a further preferred embodiment, the housing part is not only made in one piece in the environment of the assembly opening. But the housing part is rather also made in one piece with bearing sections at which the at least one balance shaft is journaled. In other words, the bearing sections (e.g. bearing plates) are made integrally with the housing part. The stability of the housing part is hereby improved even further.

In accordance with a further development of the balance shaft unit in accordance with the invention, a drive shaft of a pump is furthermore journaled in the housing part, with the named second gear being associated with the drive shaft and being connected, in particular rotationally fixedly connected, to the drive shaft of the pump. The first and the second gears form a transmission stage which drive-operatively connects the balance shaft and the drive shaft of the pump to one another. In other words, a pump is at least partly integrated into the housing part of the balance shaft unit. The pump and the balance shaft are driven together, with the drive-operative coupling being established by the named transmission stage. This coupling of the pump and of the balance shaft allows a compact construction of the balance shaft unit and permits an efficient operation of the named components since separate drive paths do not have to be provided for the balance shaft and the pump.

An advantageous aspect of such a balance shaft unit provides that the housing part forms a housing of the pump at least in part. This form of integration of the pump into the balance shaft unit enables a further component reduction without the functionality of the balance shaft unit being impaired.

A particular compact manner of construction results when the pump and the balance shaft are arranged sequentially with respect to the longitudinal axis of the balance shaft, with the transmission stage being arranged between the pump and the balance shaft. The drive shaft of the pump and the balance shaft do not have to be arranged coaxially in this respect. It is only decisive that the transmission stage in this embodiment of the balance shaft unit in accordance with the invention is arranged in a direction of view along the longitudinal extent of the balance shaft unit between the pump and the balance shaft. In special applications, the transmission stage can, however, also be arranged in the region of one of the end face sides of the balance shaft unit so that the pump and the balance shaft are arranged together on a side of the transmission stage.

The balance shaft can have an input member for the reception of a driving torque from the internal combustion engine so that the pump can be driven by the balance shaft via the transmission stage during the operation of the balance shaft unit. Alternatively to this, the drive shaft of the pump can have an input member for the reception of a driving torque from the internal combustion engine so that the balance shaft can be driven by the drive shaft of the pump via the transmission stage during the operation of the balance shaft unit.

In other words, the internal combustion engine first drives the balance shaft which in turn drives the pump via the transmission stage in the first of the variants described above. The second variant describes the reversal of the drive order. Independently of the drive order, the transmission stage between the balance shaft and the drive shaft is preferably designed such that the drive shaft of the pump rotates more slowly than the balance shaft on operation of the balance shaft unit. I.e. in the first variant, a rotation of the drive shaft of the pump is speed reduced. In the second variant, a rotation of the balance shaft is speed increased.

Alternatively or additionally to the formation of the balance shaft unit with a transmission stage for a pump, the balance shaft unit can include a further balance shaft which is journaled in the housing part, with the named second gear to be associated with the further balance shaft and to be connected, in particularly rotationally fixedly connected, to the further balance shaft. The first gear and the second gear in this case form a synchronization stage which connects the balance shaft and the further balance shaft drive-operatively to one another. If both a transmission stage for a pump and a synchronization stage for a further balance shaft are provided, the balance shaft unit preferably includes more than two gears, with one of the aforesaid "second gears" actually being able to be formed by a third gear or a fourth gear.

It is preferred if at least some of the named gears of the balance shaft unit are rotationally fixedly connected by means of a press fit—in particular a shrink connection—to the associated shaft (e.g. drive shaft or balance shaft).

In accordance with a particularly compact and robust embodiment of the balance shaft unit in accordance with the invention, the named transmission stage or the named synchronization stage is a spur gear arrangement.

Similar to the assembly opening for the introduction of the at least one gear, at least one second assembly opening can be provided through which the named balance weight can be introduced into the interior of the housing part for the assembly of the balance shaft unit.

The present invention furthermore relates to a method for the assembly of a balance shaft unit in accordance with at least one of the embodiments described above. This method includes the introduction of at least one of the named two gears into the interior of the housing part through the assembly opening and along the introduction passage and the positioning of the respective gear in an assembly position, with afterward a shaft associated with the respective gear being rotationally fixedly connected to the gear inside the housing part.

The shaft associated with the gear can be introduced axially into the housing part through an associated introduction opening, for example.

A particularly efficient method for the connection of the associated shaft to the respective gear comprises a shrinking process. Provision is in particular made that the shaft is cooled and/or the gear is heated before the connection of the shaft to the respective gear.

In addition to the named at least one gear which is introduced into the interior of the housing part through the assembly opening, at least one further gear can be introduced axially adjacent to this gear into the interior of the housing part through the assembly opening and the introduction passage and can be held in an assembly position, with afterward a shaft associated with the further gear being rotationally fixedly connected to the named gear within the housing part. The named gear and the named further gear can hereby be assembled axially adjacent to one another inside the housing part, with the assembly opening having a minimal outline so that the housing part is characterized by a high stability.

As regards the assembly order, the three variants are possible for the method in accordance with the invention.

In accordance with a first variant, the first gear and the second gear can be introduced into the interior of the housing part through the assembly opening and the introduction passage and can simultaneously be held in a respective assembly position, with the balance shaft only afterward being rotationally fixedly connected to the first gear and a shaft associated with the second gear being rotationally fixedly connected to the second gear (parallel assembly). This variant is particularly efficient since the two gears can be connected to the respective shaft simultaneously or at a brief time interval. The introduction and holding of the first gear and of the second gear can take place by means of a respective gripping device, with the one gripping device engaging around the other gripping device, for example. The assembly opening must have a sufficient length for this purpose.

In accordance with a second variant, the first gear can be introduced into the interior of the housing part through the assembly opening and the introduction passage in a first assembly step and afterward the balance shaft can be rotationally fixedly connected to the first gear. In a second assembly step, the second gear can be introduced into the interior of the housing part through the assembly opening and the introduction passage and afterward a shaft associated with the second gear can be rotationally fixedly connected to the second gear. In this variant, the first assembly step is carried out before or after the second assembly step. The two assembly steps are therefore carried out sequentially (sequential assembly). This simplifies the handling of the gears. The length of the assembly opening can in this case correspond to the diameter of the largest of the gears to be introduced plus the required free space for the gripping device.

In accordance with a third variant, only one of the two gears is introduced into the interior of the housing part through the assembly opening and the introduction passage, with the other of the two named gears being axially introduced into the interior of the housing part through an associated introduction opening of the housing part. Within the framework of the invention, only one single gear of a drive stage can also therefore be introduced into the interior of the housing part in the radial direction through the assembly opening.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
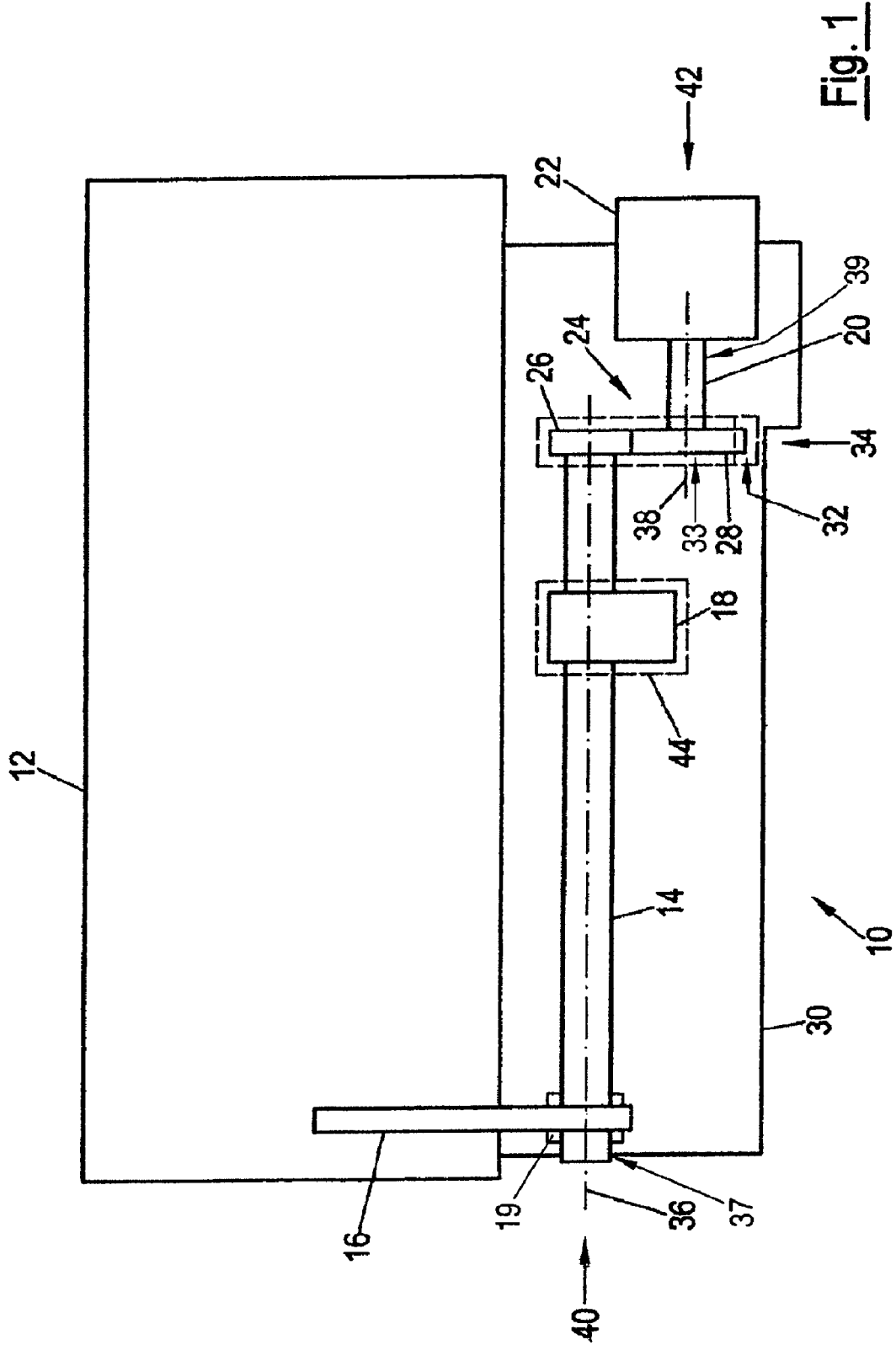
FIG. 1 is a schematic representation of an embodiment of the balance shaft unit in accordance with the invention.

FIG. 1 shows a balance shaft unit 10 which is connected to an engine 12 of a motor vehicle. The balance shaft unit 10 includes a balance shaft 14 which is driven by a crankshaft, not shown, of the engine 12 via a drive connection 16 only shown schematically. The balance shaft 14 is provided with a balance weight 18 which is rotationally fixedly connected to the balance shaft 14. The unbalance of the balance shaft 14 caused by the balance weight 18 counters the free forces of inertia/moments of inertia of the engine 12 to reduce its operating noise and vibrations. The drive connection 16 can, for example, include gears, chains and/or toothed belts. In FIG. 1, an input gear 19 rotationally fixedly connected to the balance shaft 14 is shown by way of example.

The balance shaft 14 is furthermore drive-operatively connected to a drive shaft 20 of a pump 22. This connection is established by a transmission stage 24. The transmission stage 24 includes a balance shaft gear 26 which is rotationally fixedly connected to the balance shaft 14 and a drive shaft gear 28 which is rotationally fixedly connected to the drive shaft 20.

During the operation of the engine 12, the balance shaft 14 is thus driven first which in turn drives the pump 22 which is, for example, responsible for the conveying of lubrication oil. In alternative embodiments, the drive of the balance shaft 14 can also take place via a pump 22 driven by the crankshaft, i.e. the drive order is swapped over in this case.

The balance shaft unit 10 has a housing component 30 which is made in one piece and in which both the balance shaft 14 and the drive shaft 20 are journaled, with details of the journaling not being shown in FIG. 1. The housing component 30 also receives a part of the pump 22, whereby a compact assembly results which satisfies a plurality of functions (mass balancing and lubricant conveying) and which has an efficient drive concept. The one-part design of the housing component 30 has a positive effect on the stability of the balance shaft unit 10 and reduces the steps required for its assembly.

To simplify the assembly, the housing component 30 has a lateral assembly opening at the outer side in the form of an assembly slit 32 (shown in dashed lines) which continues into the interior of the housing component 30 as an introduction passage 33 (likewise shown in dashed lines) and through which the balance shaft gear 26 and the drive shaft gear 28 can be introduced into the interior of the housing component 30. The named introduction passage 33 extends perpendicular, i.e. radially, to the axes of rotation 36, 38 of at least one of the balance shaft 14 and the drive shaft 20. The gears 26, 28 are arranged sequentially in the housing component 30 with respect to the radial direction of extent of the introduction passage 33. After the introduction of the gears 26, 28 of the transmission stage 24 into the housing component 30, which is symbolized by an arrow 34 indicating the direction of introduction, the balance shaft 14 and the drive shaft 20 are inserted into the housing component 30 along their respective axes of rotation 36 and 38 through a respective introduction opening 37 and 39 (represented by the arrows 40 and 42 respectively which typify the corresponding assembly movements) until they are in connection with the gears 26 and 28 respectively. The requirement for this is that the gears 26, 28 are positioned suitably in the interior of the housing component 30 so that the shafts 14, 20 respectively associated with them can be pushed into corresponding bores (not shown) of the gears 26, 28.

In a similar manner, the balance weight 18 can also be introduced into the interior of the housing component 30 through a second lateral assembly window 44 in order there to be connected to the balance shaft 14. This can take place, for example, by a "pushing through" of the balance shaft 14 through a bore in the balance weight 18. The balance weight 18 can be rotationally fixedly connected to the balance shaft 14 by means of a shrink connection, by a screw connection, by welding or in another manner.

An advantageous connection between the gears 26, 28 and the shafts 14 and 20 is represented by a press fit which is generated, for example, by thermal shrinking processes. For this purpose, the gears 26, 28 are heated for the assembly and/or the shafts 14, 20 are cooled so that the shafts 14, 20 can be inserted substantially free of resistance into the bores of the gears 26, 28. On the alignment of the temperature level, the shafts 14, 20 expand, whereas the diameters of the bores of the gears 26, 28 reduce. In other words, the gears 26, 28 are "shrunk" onto the shafts 14 and 20, whereby a very stable and reliable connection of the named components arises. The balance weight 18 can also be connected to the balance shaft 14 in a similar manner.

In the embodiment of the balance shaft unit 10 in accordance with the invention shown in FIG. 1, the transmission stage 24 is arranged between the balance shaft 14 and the pump 22 with respect to the longitudinal extent of the balance shaft unit 10 (or in other words: in a direction parallel to the axes of rotation 36, 38 of the shafts 14 and 20), with the axes of rotation 36, 38 being offset parallel to one another. This geometrical arrangement allows a "slim" design of the balance shaft unit 10. It is generally also possible to arrange the balance shaft 14 and the pump 22 on a side of the transmission stage 24, which would result in a more compact configuration.

The "sequential" arrangement has the result that the assembly slit 32 is arranged laterally at the housing component 30 and not at one of the end face sides of the housing component 30. Starting from the end face sides, in the assembly of the balance shaft unit 10, the shafts 14, 20 are introduced through corresponding openings.

The elongate outline of the assembly slit 32 cannot be recognized in FIG. 1 due to the perspective shown and extends in the embodiment shown in FIG. 1 at the lower side of the balance shaft unit 10 substantially perpendicular to the axes of rotation 36, 38. In the embodiment shown, a dimensioning of the outline which is marginally larger than the outline of the gear 28 is generally sufficient for the introduction of the gears 26, 28. With different length/width ratios of the gears 26, 28, the assembly slit can have an outline differing from a simple rectangular shape and can be made in L shape, for example. The housing component 30 is in one piece in the environment of the assembly slit. Overall, a high stability of the housing component 30 is achieved by these measures.

A further advantage of the balance shaft unit 10 in accordance with the invention consists of the fact that the balance shaft unit 10 can be preassembled in a simple manner and can subsequently be fastened to the engine 12. In addition, a reliable and precisely aligned journaling of the components is automatically ensured by the one-piece structure of the housing component 30 bearing the shafts 14, 20.

Figure 2:
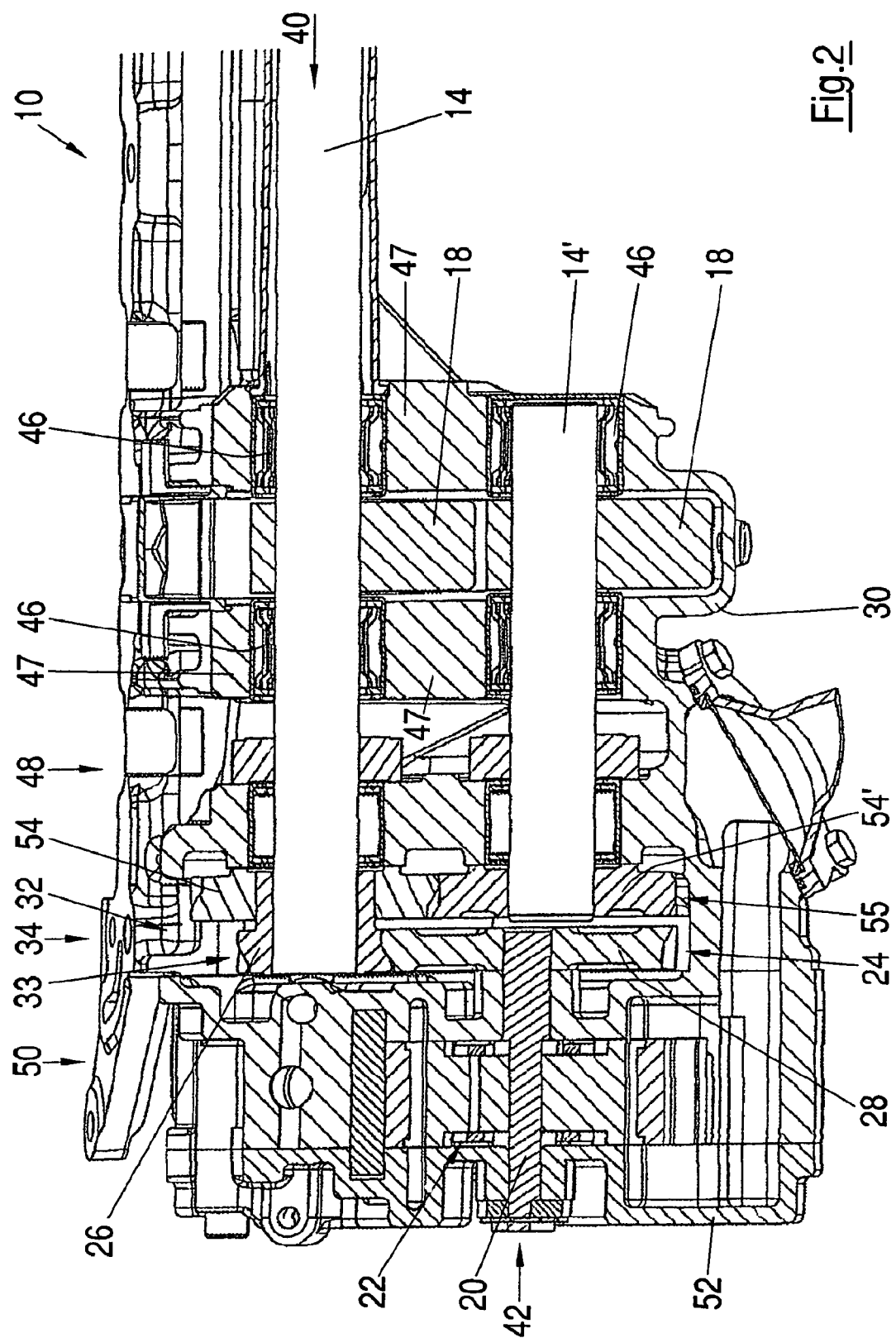
FIG. 2 is a longitudinal section of a further embodiment of the balance shaft unit in accordance with the invention.
Figure 3:
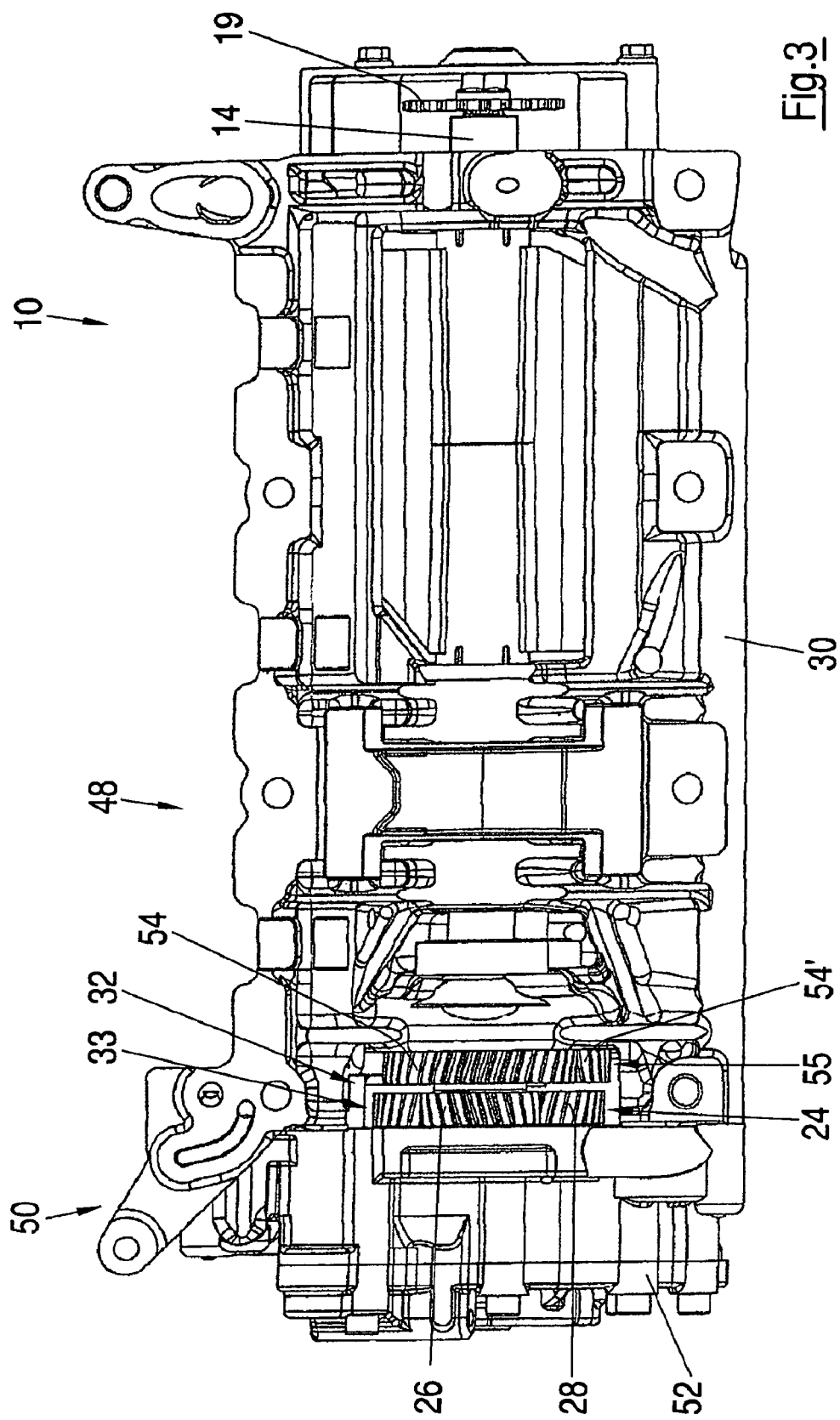
FIG. 3 is a plan view of the embodiment in accordance with FIG. 2.
Figure 4:
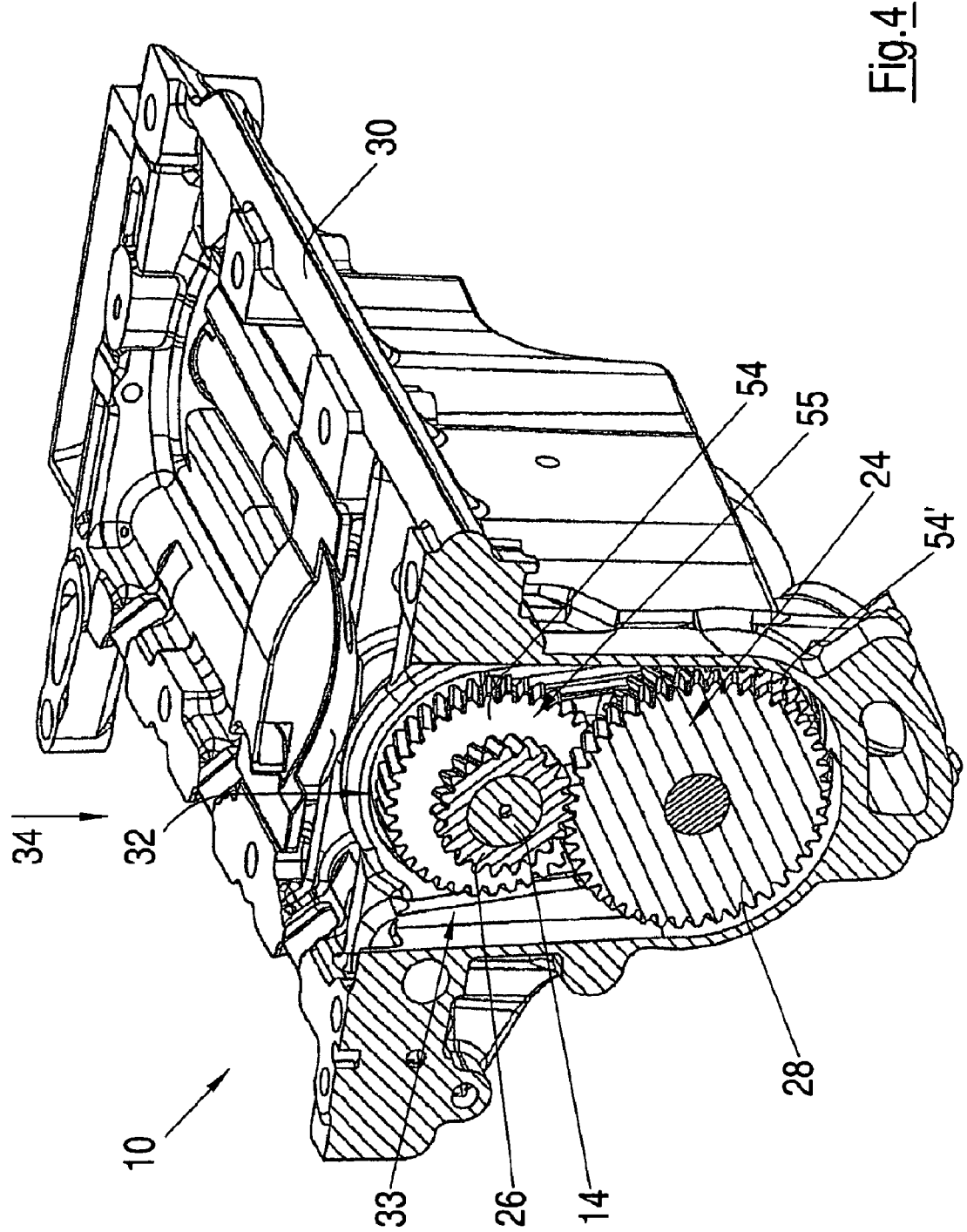
FIG. 4 is a perspective view of a section through the introduction passage of the embodiment in accordance with FIG. 2 perpendicular to the axes of rotation of the balance shafts.

FIGS. 2 to 4 show a more detailed representation of a further embodiment of a balance shaft unit 10 in its position of use. It includes two balance shafts 14, 14' which each have a balance weight 18. The first balance shaft 14 (at the top in FIG. 2) has a larger longitudinal extent than the second balance shaft 14' (at the bottom in FIG. 2). The former is drive-connected to the engine 12 at its right hand end in FIG. 2 (cf. input gear 19 in FIG. 3). Despite the different longitudinal extents, the two balance shafts 14, 14' produce a vibration and noise damping effect substantially of the same order of magnitude since their balance weights 18 are substantially of the same design.

The balance shafts 14, 14' are journaled in bearings 46 which are inserted into bearing plates 47 which are made in one piece with the housing component 30.

The part of the balance shaft unit including the journaling of the balance shafts 14, 14' and the balance weights 18 forms a first functional unit 48 operable for mass balancing. A further or second functional unit 50 includes the pump 22 with its drive shaft 20 which is responsible for the provision of lubricant, for example, for the engine 12. The design of the pump 22—for example a vane pump—is of no significance for the present invention and will therefore not be described in detail. It must, however, be noted that the pump 22 does not have a housing of its own. A section of the housing component 30 forms the housing of the pump 22 so that only the drive shaft 20 and the further components of the pump 22 have to be introduced into a correspondingly shaped cut-out in the housing component 30 on the assembly. Subsequently, the end face side of the balance shaft unit 10 at the left in FIG. 2 is closed by a housing cover 52.

In a similar manner as in the embodiment of the balance shaft unit 10 described with reference to FIG. 1, the transmission stage 24 is arranged between the functional units 48 and 50. It includes, in addition to the balance shaft gear 26 and the drive shaft gear 28, a further two gears 54, 54' which form a synchronization stage 55 to establish a drive-operative connection between the balance shafts 14, 14'. The gear 54 is placed rotationally fixedly onto a hollow shaft section of the balance shaft gear 26 in the embodiment shown and forms a unit together with it. This unit can be preassembled or can only be assembled in the interior of the housing component 30. It can generally also be made in one piece. Alternatively, the gear 54 of the synchronization stage 55 can be rotationally fixedly connected to the first balance shaft 14 separately from the balance shaft gear 26. The gear 54' of the synchronization stage 55 is rotationally fixedly connected to the second balance shaft 14'.

The gears 54 and 54' of the synchronization stage 55 are designed such that no step-down or step-up of the rotary movement of the balance shaft 14' relative to the rotary movement of the balance shaft 14 takes place since the two balance shafts 14, 14' should rotate at the same speed—albeit in opposite rotary directions. The drive-operative connection of the balance shaft 14 and of the drive shaft 20 of the pump 22 via the gears 26, 28 (transmission stage 24) in contrast includes a speed reduction of the rotary movement of the balance shaft 14 since the pump 22 should be operated at a lower speed than the balance shafts 14, 14'.

The assembly slit 32 is arranged in FIG. 2 at the upper side of the balance shaft unit 10 which adjoins the lower side of the engine in the position of use of the balance shaft unit 10. The introduction passage 33 extends in a vertical direction into the interior of the housing component 30. The housing component 30 also surrounds the periphery of the assembly slit 32 in one piece in the embodiment shown in FIGS. 2 to 4. At the surface of the housing component 30, the assembly slit 32 has a substantially rectangular outline whose length approximately corresponds to the diameter of the drive shaft gear 28 (which has the largest diameter of the gears 26, 28, 54, 54') and whose width corresponds to the axial thickness of the balance shaft gear 26 including the named hollow shaft section (the balance shaft gear 26 having the largest thickness of the gears 26, 28, 54, 54'). This width at the same time corresponds to the sum of the axial thickness of the drive shaft gear 28 and of the axial thickness of the gear 54'. The named length of the outline of the assembly slit 32 is preferably somewhat larger than the diameter of the drive shaft gear 28 so that the drive shaft gear 28 can be held laterally by means of two robot grips or another gripping device for the purpose of alignment during the connection to the drive shaft 20. This is possible in the embodiment shown since the larger (28) of the two gears 26, 28 is arranged behind the smaller (26) of the two gears 26, 28 with respect to the direction of introduction 34 of the assembly slit 32.

The assembly generally takes place in accordance with the procedure described in connection with FIG. 1. At least one (or more or all) of the gears 26, 28, 54, 54' is in particular introduced into the interior of the housing component 30 through the assembly opening 32 and along the introduction passage 33 by means of a respective gripping device and is held there in an assembly position, with afterward the shafts 14, 14', 20 being introduced axially into the housing component 30 and being rotationally fixedly connected to the respective gear 26, 28, 54, 54' within the housing component 30 on the basis of a shrinking process. It is in this respect not absolutely necessary that all the gears 26, 28, 54, 54' are first introduced into the housing component 30 and the gears are only afterward connected to the shafts (14, 14', 20 (parallel assembly). A respective one gear can rather also be introduced and be connected to the associated shaft before the next gear is introduced and connected to the associated shaft (sequential assembly). It must also be noted that two gears 28 and 54' or 26 and 54 can be introduced into the housing component 30 simultaneously and can be held there in a respective assembly position so that the four gears 26, 28, 54, 54' can, for example, also be introduced and connected to the associated shaft 14, 14', 20 pair-wise. It is furthermore also possible that at least one of the gears (e.g. the drive shaft gear 28) is introduced into the housing component 30 in an axial direction through a suitable introduction opening.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

REFERENCE NUMERAL LIST 10 balance shaft unit
12 engine
14, 14' balance shaft
16 drive connection
18 balance weight
19 input gear
20 drive shaft
22 pump
24 transmission stage
26 balance shaft gear
28 drive shaft gear
30 housing component
32 assembly slit
33 introduction passage
34 introduction direction
36 axis of rotation
37 introduction opening
38 axis of rotation
39 introduction opening
40, 42 assembly movement
44 assembly window
46 bearing
47 bearing plate
48, 50 functional unit
52 housing cover
54, 54' gear
55 synchronization stage

The invention claimed is:
1. A balance unit mass balancing for an internal combustion engine of a motor vehicle, comprising:
a housing part having at least one assembly opening which communicates with an introduction passage extending perpendicular to a longitudinal axis of the balancing shaft;
at least one balance shaft journaled in the housing part, the balance shaft having at least one balance weight; and a first gear meshingly engaged with a second gear, at least one of the first and second gears introduced into an interior portion of the housing part through the assembly opening and the introduction passage such that the first and second gears are arranged sequentially within the introduction passage;

wherein the housing part continuously surrounds the periphery of the assembly opening in one piece, with a length of the assembly opening at an outer side of the housing part in a plane normal to the longitudinal axis of the balance shaft being larger than a diameter of the at least one of the first and second gears, but being smaller than a sum of the diameters of the first and second gears.

2. The balance unit in accordance with claim 1, wherein the assembly opening at the outer side of the housing part is formed by a slit whose longitudinal extent extends in a plane normal to the longitudinal axis of the balance shaft.

3. The balance unit in accordance with claim 1, wherein a width of the assembly opening at the outer side of the housing part in a direction aligned with the longitudinal axis of the balance shaft corresponds to a thickness of at least one of the first and second gears or to a thickness of the first gear and a third gear collinearly aligned with the first gear.

4. The balance unit in accordance with claim 1, wherein the introduction passage extends in a vertical direction relative to a position of use of the balance unit, with the assembly opening being arranged at an upper side of the housing part.

5. The balance unit in accordance with claim 1, wherein a larger of the two gears is arranged below a smaller of the two gears with respect to the direction of extent of the introduction passage.

6. The balance unit in accordance with claim 1, wherein the housing part is made in one piece with bearing sections at which the balance shaft is journaled.

7. The balance unit in accordance with claim 1, further comprising:
a drive shaft of a pump journaled in the housing part, with the first gear being associated with the balance shaft and the second gear being associated with the drive shaft, with the first gear and the second gear forming a transmission stage that connects the balance shaft and the drive shaft of the pump to one another drive-operatively.

8. The balance unit in accordance with claim 7, wherein the housing part at least partially forms a housing of the pump.

9. The balance unit in accordance with claim 7, wherein the pump and the balance shaft are arranged sequentially with respect to the longitudinal axis of the balance shaft, with the transmission stage being arranged between the pump and the balance shaft.

10. The balance unit in accordance with claim 7, wherein the housing part has an introduction opening through which the drive shaft of the pump is introduced axially into the housing part separately from the second gear, with the first gear being introduced into the interior of the housing part through the assembly opening separately from the balance shaft.

11. The balance unit in accordance with claim 7, wherein the balance shaft has an input member for receiving a driving torque from the internal combustion engine so that the drive shaft of the pump is driven by the balance shaft via the transmission stage during operation of the balance unit, and wherein the transmission stage is operable to reduce the rotary speed of the drive shaft relative to the rotary speed of the balance shaft.

12. The balance unit in accordance with claim 7, wherein the drive shaft of the pump has an input member for receiving a driving torque from the internal combustion engine so that the balance shaft is driven by the drive shaft of the pump via the transmission stage during operation of the balance unit, and wherein with the transmission stage is operable to increase the rotary speed of the balance shaft relative to the rotary speed of the drive shaft.

13. The balance unit in accordance with claim 1, further comprising a second balance shaft that is journaled in the housing part, the first gear being associated with the first balance shaft and the second gear being associated with the second balance shaft, and wherein the first gear and the second gear form a synchronization stage that connects the first balance shaft and the second balance shaft to one another drive-operatively.

14. The balance unit in accordance with claim 7, wherein the first and second gears are rotationally fixedly connected to corresponding ones of the balance shaft and the drive shaft by a press fit.

15. The balance unit in accordance with claim 1, wherein the housing part has at least one second assembly opening through which the balance weight is introduced into the interior of the housing part.

16. The balance unit in accordance with claim 1, wherein the housing part has an introduction opening through which the balance shaft is introduced axially into the housing part separately from the first gear, with the first gear being introduced into the interior of the housing part through the assembly opening separately from the balance shaft.

17. A method for the assembly of a balance shaft unit for use with an internal combustion engine of a motor vehicle including at least one balance shaft having at least one balance weight and a housing part in which the balance shaft is journaled, wherein a first gear is associated with the balance shaft and meshes with a second gear, with the housing part having at least one assembly opening, comprising:
introducing at least one of the first and second gears into an interior of the housing part through the assembly opening and along an introduction passage formed in the housing part and which communicates with the assembly opening, the introduction passage extending perpendicular to a longitudinal axis of the balance shaft, and the first gear and the second gear being arranged sequentially with respect to a direction of extent of the introduction passage;
holding the at least one of the first and second gears in an assembly position within the introduction passage; and
rotationally fixedly connecting at least one of the balance shaft with the first gear and a second shaft with the second gear within the housing part, wherein the housing part surrounds the periphery of the assembly opening in one piece, with the length of the assembly opening at the outer side of the housing part in a plane normal to the longitudinal axis of the balance shaft being larger than a diameter of the at least one of the first and second gears, but being smaller than a sum of the diameters of the first and second gears.

18. The method in accordance with claim 17, wherein at least one of the balance shaft associated with the first gear and the second shaft associated with the second gear is introduced axially into the housing part.

19. The method in accordance with claim 17, wherein at least one of the first and second gears are rotationally fixedly connected by a shrinking process to a corresponding one of the balance shaft and the second shaft.

20. The method in accordance with claim 19, wherein, before connecting the gear to the shaft associated with the gear, the shaft is cooled and/or the gear is heated.

21. The method in accordance with claim 17, further comprising introducing a third gear, axially adjacent to the first gear, into the interior of the housing part through the assembly opening and along the introduction passage, holding the third gear in an assembly position, and rotationally fixedly connecting the third gear to the balance shaft or the first gear within the housing part.

22. The method in accordance with claim 17, wherein the first gear and the second gear are introduced into the interior of the housing part through the assembly opening and the introduction passage and are simultaneously held in a respective assembly position, the balance shaft being rotationally fixedly connected to the first gear and the second shaft associated with the second gear being rotationally fixedly connected to the second gear.

23. The method in accordance with claim 17, wherein the first gear is introduced into the interior of the housing part through the assembly opening and the introduction passage in a first assembly step with the balance shaft subsequently being rotationally fixedly connected to the first gear, and wherein the second gear is introduced into the interior of the housing part through the assembly opening and the introduction passage in a second assembly step with the second shaft associated with the second gear being rotationally fixedly connected to the second gear, the first assembly step being carried out before or after the second assembly step.

24. The method in accordance with claim 17, wherein only one of the first and second gears is introduced into the interior of the housing part through the assembly opening and the introduction passage, with the other of the first and second gears being introduced axially into the interior of the housing part through an associated introduction opening of the housing part.

25. The balance unit in accordance with claim 10, wherein the housing part includes a second introduction opening through which the balance shaft is introduced axially into the interior of the housing part.

26. The balance unit in accordance with claim 16 further including a pump disposed within the interior of the housing part, and a drive shaft introduced axially into the housing part through a second introduction opening, and wherein the drive shaft is coupled to the second gear and to a rotary component of the pump after the second gear has been introduced into the interior of the housing part through the assembly opening separately from the drive shaft.

27. The method in accordance with claim 21, further comprising introducing a fourth gear, axially adjacent to the second gear, into the interior of the housing part through the assembly opening and along the introduction passage, holding the fourth gear in an assembly position meshed with the third gear, and rotationally fixedly connecting the fourth gear to a second balance shaft within the housing part.

28. The method in accordance with claim 22, wherein the second shaft is a drive shaft of a fluid pump such that rotation of the balance shaft causes rotation of the drive shaft for actuating the fluid pump.

29. The method in accordance with claim 22, wherein the second shaft is a second balance shaft such that rotation of the first balance shaft causes rotation of the second balance shaft.

30. A balance shaft unit for use with an internal combustion engine in a motor vehicle, comprising:
 a housing defining an internal chamber and having first and second end portions, an upper portion adapted for connection to a lower portion of the engine, a transverse wall portion separating said first end portion from said internal chamber, and an introduction passage extending into said transverse wall portion and defining an assembly opening in said upper portion;
 a balance shaft disposed in said internal chamber and rotatably supported in said first end portion and said transverse wall portion of said housing for rotation about a longitudinal axis;
 a drive connection coupling said balance shaft for rotation with a rotary component of the engine;
 a balance weight fixedly mounted to said balance shaft within said internal chamber;
 a gearset installed through said assembly opening and disposed within said introduction passage, said gearset including a first gear adapted for connection to said balance shaft and a second gear meshed with said first gear; and
 a second shaft rotatably supported by said housing and adapted for connection to said second gear.

31. The balance shaft unit of claim 30 wherein said second shaft is a drive shaft for a fluid pump that is rotatably supported between said second end portion and said transverse wall portion of said housing.

32. The balance shaft unit of claim 31 further comprising a second balance shaft rotatably supported in said internal chamber, and a second gearset installed through said assembly opening and disposed within said introduction passage, said second gearset including a third gear adapted for connection to one of said first balance shaft and said first gear and a fourth gear meshed with said third gear that is adapted for connection to said second balance shaft.

33. The balance shaft unit of claim 31 wherein said pump is mounted in a pump chamber formed in said second end portion of said housing, said pump chamber enclosed by a cover mounted to said second end portion of said housing.

34. The balance shaft unit of claim 30 wherein said second shaft is a second balance shaft disposed in said internal chamber such that said gearset provides a drive connection between said first and second balance shafts.

35. The balance shaft unit of claim 30 wherein a length dimension of said assembly opening in a plane normal to said longitudinal axis of said balance shaft is larger than the diameter of each of said first and second gears but smaller than the sum of the diameters for said first and second gears.

* * * * *